United States Patent
Lund et al.

(10) Patent No.: US 12,116,985 B2
(45) Date of Patent: Oct. 15, 2024

(54) GRID FORMING WIND TURBINE WITH AN ELECTRIC STORAGE

(71) Applicant: VESTAS WIND SYSTEMS A/S, Aarhus N. (DK)

(72) Inventors: Torsten Lund, Fredericia (DK); John Godsk Nielsen, Hornslet (DK); Gert Karmisholt Andersen, Hovedgård (DK); Kouroush Nayebi, Ikast (DK); Poul Brandt Christensen, Ry (DK); Germán Claudio Tarnowski, Aarhus N (DK); Esmaeil Ebrahimzadehveshareh, Aalborg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 31 days.

(21) Appl. No.: 17/922,413

(22) PCT Filed: Apr. 22, 2021

(86) PCT No.: PCT/DK2021/050121
§ 371 (c)(1),
(2) Date: Oct. 31, 2022

(87) PCT Pub. No.: WO2021/219177
PCT Pub. Date: Nov. 4, 2021

(65) Prior Publication Data
US 2023/0184218 A1    Jun. 15, 2023

(30) Foreign Application Priority Data

Apr. 30, 2020    (DK) .................................. 2020 70269

(51) Int. Cl.
*F03D 9/00*    (2016.01)
*F03D 9/11*    (2016.01)
(Continued)

(52) U.S. Cl.
CPC ................ *F03D 9/11* (2016.05); *F03D 9/255* (2017.02); *H02P 9/105* (2013.01);
(Continued)

(58) Field of Classification Search
CPC ..... F03D 9/11; F03D 9/255; H02J 3/32; H02J 7/00712; H02J 2207/20; H02J 2207/50;
(Continued)

(56) References Cited

U.S. PATENT DOCUMENTS

| 5,798,631 A | 8/1998 | Spee et al. |
| 2011/0163546 A1 | 7/2011 | Gupta et al. |

(Continued)

FOREIGN PATENT DOCUMENTS

| CN | 107465212 A | 12/2017 |
| CN | 108631335 A | 10/2018 |

(Continued)

OTHER PUBLICATIONS

Danish Patent and Trademark Office, 1st Technical Examination including The Search Report and Search Opinion for Application PA 2020 70269 dated Oct. 26, 2020.
(Continued)

*Primary Examiner* — Julio C. Gonzalez
(74) *Attorney, Agent, or Firm* — Patterson + Sheridan, LLP

(57) ABSTRACT

The invention relates to a method for controlling power generation of a VSM wind turbine. The wind turbine comprises a machine side converter, a line side converter, a DC link, and an electric storage device electrically connected to the DC link. The method comprises determining a first power control signal to the machine side converter, determining a second power control signal for controlling a desired output power of the line side converter based on a storage device voltage error, and a power production refer- (Continued)

ence, and determining a charging current reference for controlling charging and discharging of the electric storage device based on a DC-link voltage error.

19 Claims, 5 Drawing Sheets

(51) Int. Cl.
  *F03D 9/25* (2016.01)
  *H02P 9/10* (2006.01)
  *H02J 3/32* (2006.01)
  *H02J 7/00* (2006.01)
  *H02P 101/15* (2016.01)
  *H02P 103/20* (2016.01)

(52) U.S. Cl.
  CPC ......... *F05B 2270/1033* (2013.01); *H02J 3/32* (2013.01); *H02J 7/00712* (2020.01); *H02J 2207/20* (2020.01); *H02J 2207/50* (2020.01); *H02J 2300/28* (2020.01); *H02P 2101/15* (2015.01); *H02P 2103/20* (2015.01)

(58) Field of Classification Search
  CPC ....... H02J 2300/28; H02J 3/381; H02P 9/105; H02P 2101/15; H02P 2103/20; F05B 2270/1033; Y02E 10/72; Y02E 10/76
  See application file for complete search history.

(56) References Cited

U.S. PATENT DOCUMENTS

| | | | |
|---|---|---|---|
| 2011/0215649 A1* | 9/2011 | Min | ........................ H02J 3/381 |
| | | | 307/72 |
| 2011/0222320 A1* | 9/2011 | Delmerico | ................ H02J 3/32 |
| | | | 363/37 |
| 2017/0133852 A1 | 5/2017 | Macdonald | |
| 2019/0131888 A1 | 5/2019 | Zhong | |
| 2020/0091728 A1* | 3/2020 | Cassoli | ................... F03D 9/255 |

FOREIGN PATENT DOCUMENTS

| | | |
|---|---|---|
| CN | 111049177 A | 4/2020 |
| EP | 3533996 A1 | 9/2019 |
| WO | 2021219177 A1 | 11/2021 |

OTHER PUBLICATIONS

PCT, International Search Report for Application PCT/DK2021/050121 dated Jul. 14, 2021.
PCT, Written Opinion of The International Searching Authority for Application PCT/DK2021/050121 dated Jul. 14, 2021.

\* cited by examiner

GRID FORMING WIND TURBINE WITH AN ELECTRIC STORAGE

FIELD OF THE INVENTION

The invention relates to control of wind turbines, and particularly control of wind turbines configured to exhibit a virtual synchronous machine response.

BACKGROUND OF THE INVENTION

In order to allow a higher penetration of renewable energy sources such as wind turbines into the electrical grid, some countries propose requirements to equip the power converters with grid-forming properties similar to conventional synchronous machines. These requirements can be addressed by configuring the renewable power generating units as virtual synchronous machines.

Wind turbines configured as virtual synchronous machines may experience increased mechanical loads. For this and other reasons there is a need for improving wind turbines.

SUMMARY OF THE INVENTION

It is an object of the invention to improve wind turbines, particularly wind turbines configured as virtual synchronous machines and to alleviate the problem with increased mechanical loads and other problems with wind turbines configured as virtual synchronous machines.

In a first aspect of the invention there is provided a control system configured for controlling power generation of a wind turbine configured as a grid forming inverter, the wind turbine comprises a generator driven by a rotor, a machine side converter, a line side converter arranged to supply power to a grid, a DC link electrically connected to an output of the machine side converter and an input of the line side converter, and an electric storage device electrically connected to the DC link, the control system comprises

- a power controller arranged to determine a first power control signal to the machine side converter based on a power reference and a generator power for controlling an output power of the machine side converter,
- a charging controller arranged to determine a second power control signal for controlling, at least indirectly, a desired output power of the line side converter based on a storage device voltage error, and a power production reference,
- a DC-link controller arranged to determine a charging current reference for controlling charging and discharging of the electric storage device based on a DC-link error.

Advantageously, the use of the electric storage device as a power source for adjusting the DC-link voltage, may reduce the need for adjusting the generator power and thereby reduces mechanical loads of the wind turbine such a drive train loads.

Examples of the electric storage device include batteries, super capacitors, fly wheels and superconducting magnetic energy storage as well as combinations of different types of electric storage devices.

Examples of the grid forming inverter configured wind turbines include wind turbines configured as a virtual synchronous machines.

As an advantageous example, at low wind where the wind turbine operates close to the stalling region, the electric storage device can deliver grid power via the DC-link charging device, thereby avoiding taking more power out of the rotor (or even reduce rotor power). Effectively, the electric storage device increases the power gap to the stalling region.

According to an embodiment, the control system is configured to determine the power reference dependent on the power production reference and dependent on the charging current reference and a charging limit.

The charging limit defines a maximal current (or power) charging or discharging capacity of the electric storage device and/or a DC converter connected between the electric storage device and DC-link. Advantageously, by determining the power reference dependent on the power production reference and dependent on the charging current reference and a charging limit, the power reference for the machine side converter can be adjusted if the charging current reference exceeds the charging limit.

According to an embodiment, the DC-link controller is further configured to determine the charging current reference dependent on a limit function arranged to limit the charging current reference to a limited charging reference if the charging reference exceeds a charging limit.

According to an embodiment, the DC-link controller is arranged to determine a power sharing reference based on a difference between the charging reference and the limited charging reference, wherein
the power reference is determined dependent on a sum of the power production reference and the power sharing reference.

Advantageously, the power sharing reference provides the change of power to be generated by the generator so that the DC-link voltage can be kept at a desired level if the current from the electric storage device is insufficient.

According to an embodiment, the DC-link controller is further configured to determine the charging reference dependent on a feedforward power difference determined based on the grid power and the power production reference.

Advantageously, the feedforward power difference helps to increase the speed of correcting a DC-link voltage error and, thereby, helps reducing the magnitude of the DC-link error.

According to an embodiment, the DC-link controller is further configured to determine the charging reference based on a control function arranged to time-integrate the DC-link error.

According to an embodiment, the electric storage device is electrically connected to the DC link via a DC-to-DC converter, wherein the DC-to-DC converter is configured to control the charging and discharging of the electric storage device based on the charging reference or the limited charging reference.

According to an embodiment, the second power control signal is applied to a virtual synchronous machine emulator which is arranged to determine a virtual synchronous machine speed or angle for controlling the line side converter.

The use of the electric storage device as a power source for adjusting the DC-link voltage may be particular advantageous for grid forming wind turbines or VSM configured wind turbines. That is, for non grid forming inverter wind turbines, the generator power is more or less decoupled from the grid. However, for a grid forming inverter wind turbine, the power flow to the grid may be coupled to events in the grid such as phase jumps and frequency gradients which can therefore by transferred to the drive train as mechanical loads.

According to an embodiment, the virtual synchronous machine emulator (233) is configured to
determine a power deviation based on a combination of the second power control signal, a grid power supplied by the line side converter to the grid and a damping power, and to
determine virtual synchronous machine speed or angle based on the power deviation so that the derivative of the virtual synchronous machine rotational speed is indicative of the power deviation.

According to an embodiment, the control system is further arranged to:
determine a converter reference for controlling the line side converter to generate the desired output power based on the virtual synchronous machine angle and a voltage reference for a voltage amplitude or a reactive power to be generated by the line side converter, and
control the line side converter based on the converter reference.

A second aspect of the invention relates to a wind turbine comprising a control system according to the first aspect.

A third aspect of the invention relates to a method for controlling power generation of a wind turbine configured as a grid forming inverter, the wind turbine comprises a generator driven by a rotor, a machine side converter, a line side converter arranged to supply power to a grid, a DC link electrically connected to an output of the machine side converter and an input of the line side converter, and an electric storage device electrically connected to the DC link, the method comprises
determining a first power control signal to the machine side converter based on a power reference and a generator power for controlling an output power of the machine side converter,
determining a second power control signal for controlling, at least indirectly, a desired output power of the line side converter based on a storage device voltage error, and a power production reference, and
determining a charging current reference for controlling charging and discharging of the electric storage device based on a DC-link error.

In general, the various aspects and embodiments of the invention may be combined and coupled in any way possible within the scope of the invention. These and other aspects, features and/or advantages of the invention will be apparent from and elucidated with reference to the embodiments described hereinafter.

A fourth aspect of the invention relates to a computer program product comprising software code adapted to control a wind turbine when executed on a data processing system, the computer program product being adapted to perform the method of the first aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
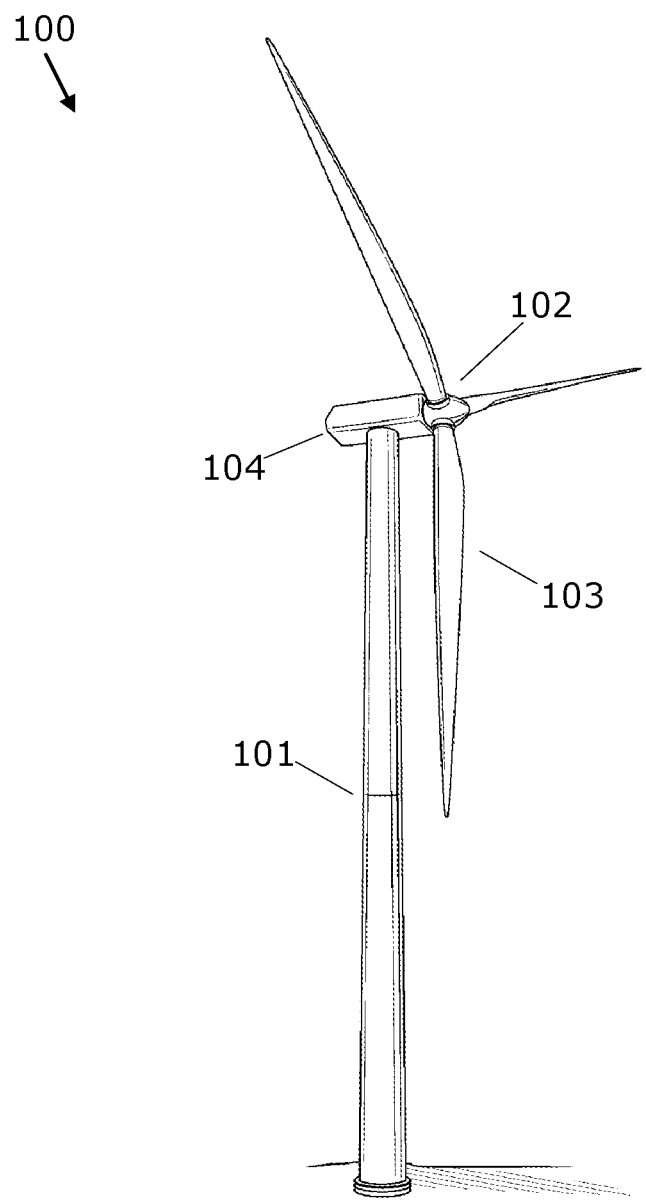
FIG. 1 shows a wind turbine.
Figure 2:
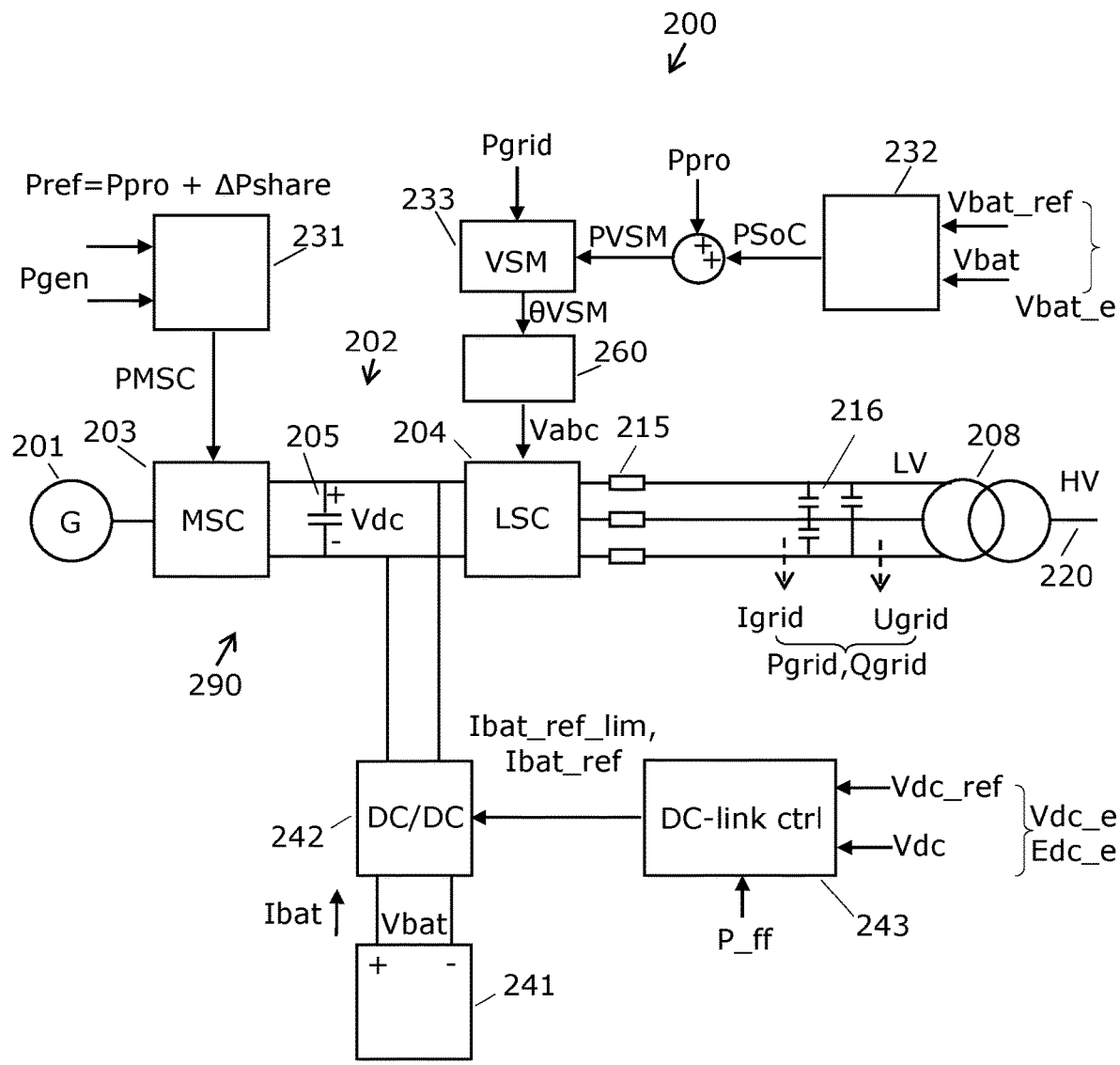
FIG. 2 shows an example of a power system and a control system of a wind turbine.

FIG. 1 shows a wind turbine 100 (WTG) comprising a tower 101 and a rotor 102 with at least one rotor blade 103, such as three blades. The rotor is connected to a nacelle 104 which is mounted on top of the tower 101 and being adapted to drive a generator situated inside the nacelle via a drive train. The drive train comprises the shaft connecting the rotor 102 with the gearbox or the generator. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator is connected with a power converter which comprises a generator side converter and a line side converter. The generator side converter converts the generator AC power into DC power and the line side converter converts the DC power into an AC power for injection into the utility grid. FIG. 2 shows an example of a power system 290 and a control system 200 of a wind turbine 100 according to an embodiment. The power system 290 comprises a generator 201 and a power converter 202.

The power converter 202 comprises a machine side converter 203 and a line side converter 204. The power converter 202 further comprises a DC-link 205 which comprises one or more DC-link capacitors which are charged by the DC output current from the generator side converter 203 and which supplies DC power to the line side converter 204. Alternatively, the power converter 202 may be configured as a multi-level converter where the DC capacitance is distributed in the arms of the converters. In this case the, DC-link capacitors in FIG. 2 may be absent. However, in general the power converter 202 comprises a machine side converter 203 and a line side converter 204.

The power converter 202 may be full-scale converter configured according to different principles including forced-commutated and line-commutated converters.

The output AC current from the line side converter 204 may be supplied via output inductors 215 and possibly via a wind turbine transformer 208 to the power line 220. In this example, the output AC current is a 3-phase current output. Harmonic filter capacitors 216 may be arranged between the conductors of the output, which together with the inductors 206, forms a harmonic filter which converts the square wave voltage signals from the line side converter 204 to voltage sinusoidal signals.

The power line 220 may be a medium voltage power bus which receives power from other wind turbines 100. The power line 220 may be connected with a high voltage network, e.g. via further transformers. Thus, the power line 220 and one or more power systems 290 of corresponding wind turbines constitutes a wind power park arranged to supply power to a utility grid for distribution of electrical power.

The power system 290 is principally illustrated and therefore does not explicitly reveal that the system may be a three phase system. However, principles of the described embodiments apply both to single and multi-phase systems. The line side converter 204 uses some variant of pulse width modulation (PWM) for converting the DC power into AC power.

The power system 290 comprises electric storage device 241 such as a battery connected to the DC link 205 via DC-to-DC converter 242. For convenience, the description refers to batteries 241 only as examples of the electric storage devices, but other devices capable of storing electrical energy such as super capacitors, fly wheels and superconducting magnetic energy storage devices are equally applicable for the electric storage device 241. Different types of electric storage devices may be combined such as a battery combined with a super capacitor. Accordingly, references to electrical variables such as Vbat and Ibat_ref applies equally to other types of the electric storage device 241.

The electric storage device 241 is capable of delivering electric energy or storing electric energy from the DC link by controlling the DC-to-DC converter 242 and thereby support maintaining a desired DC voltage over the DC link 205.

According to the embodiment in FIG. 2, the power system 290 is configured as a virtual synchronous machine and therefore comprises a virtual synchronous machine emulator 233. A possible configuration of the virtual synchronous machine emulator 233 is described in connection with FIG. 4A.

More generally, the power system 290 and the wind turbine 100 is configured as a grid forming inverter which includes virtual synchronous machine configurations and other configurations.

The control system comprises a power controller 231 arranged to determine a first power control signal PMSC for controlling the output power of the machine side converter 203. The first power control signal PMSC is determined based on a power reference Pref and the actual generator power Pgen.

The power reference Pref corresponds to the desired power production of the machine side converter 203 and may be equal to the power production reference Ppro of the desired power to be delivered by line side converter 203 to the grid.

Optionally, the power reference Pref may also include the shared power ΔPshare, to be described below, and may further include other power damping terms for damping mechanical oscillations such as drive train damping power PDTD and side-side tower damping power PSSTD.

The control system 200 further comprises a charging controller 232 arranged to determine a second power control signal PVSM for controlling the battery voltage Vbat and the desired power production Ppro to be supplied by the line side converter to the grid or power line 220. The second power control signal PVSM is determined based on the electric storage device voltage error Vbat_e which may be determined as the difference between the desired voltage Vbat_ref of the battery 241 and the actual battery voltage Vbat. The charging controller 232 such as a PI controller determines the state of charge power control signal PSoC for controlling the power generation of the line side converter 204 with an aim to reduce the storage device voltage error Vbat_e. The power production reference Ppro is added to PSoC for determining the second power control signal PVSM.

The second power control signal PVSM may be used in different ways to control the line side converter 204, e.g. via a converter reference Vabc determined based on the second power control signal PVSM.

According to the example in FIG. 2, the second power control signal PVSM is a power control signal for the virtual synchronous machine emulator 233 which determines the virtual synchronous machine angle θVSM for controlling the power production of the line side converter 204 via the modulation control system 260 according to PVSM. Accordingly, the second power control signal PVSM is applied to the virtual synchronous machine emulator 233 which is arranged to determine a virtual synchronous machine speed or angle ωVSM, θVSM for controlling the line side converter 204.

Accordingly, depending on the configuration of the control system 200, the second power control signal PVSM controls the power generation of the line side converter 204, at least indirectly.

The control system 200 further comprises a DC-link controller 243 arranged to control charging and discharging of the electric storage device 241 based on a DC-link error so as to minimize the DC-link error. The DC-link controller 243 may be configured as a PI feedback controller or other feedback controller. The DC-link error may be a DC-link voltage error Vdc_e which may be determined as the difference between the DC-link voltage reference Vdc_ref and the actual DC-link voltage Vdc. Alternatively, the DC-link error may be a DC-link energy error Edc_e which may be determined as the difference between the square of the DC-link voltage reference Vdc_ref^2 and the square of the actual DC-link voltage Vdc^2. Clearly, the DC-link energy error Edc_e may be determined in other ways dependent on the DC-link voltage reference Vdc_ref and the actual DC-link voltage Vdc. Thus, in general, the DC-link error is determined based on the DC-link voltage reference Vdc_ref and the actual DC-link voltage Vdc.

The DC-link controller 243 determines a charging current reference Ibat_ref, possibly a limited charging current reference Ibat_ref_lim, which is supplied to the DC-to-DC converter, for controlling charging and discharging of the electric storage device 241.

Accordingly, if the DC-link voltage drops, e.g. due to reduction of the generator power from the generator 201, the DC-link controller 243 controls the DC-to-DC converter to supply energy to the DC-link 205. Due to the discharging, the battery voltage Vbat will fall, which eventually leads to a reduction of the power production reference PVSM until the electric storage device voltage error Vbat_e approaches zero.

As long as the power capacity of DC-to-DC converter is large enough to maintain the DC link voltage Vdc at the desired level Vdc_ref, the power output of the machine side converter 203 need not be adjusted for compensating the DC-link voltage Vdc.

The control system 200 may be configured in various ways to compensate limitations of the battery 241 and the DC-to-DC converter 242. For example, in case the DC-link voltage reaches a lower threshold, e.g. if the DC-to-DC converter is not able to supply sufficient current to the DC-link 205, the control system 200 may be configured to control the machine side converter 203 to take over once the DC link voltage reaches a lower threshold.

In an example in FIG. 2, the control system 200 comprises a modulation control system 260 configured for controlling the modulation of the line side converter 204 and for controlling the active power and the reactive power Q generated by the line side converter 204, where the active power is controlled based on the second power control signal PVSM and the actual power generated by the line side converter 204 Pgrid.

FIG. 2 shows that the grid voltage Ugrid, here the voltage at the low voltage LV side of the transformer 208, can be measured. The grid voltage Ugrid can be used for determining a virtual synchronous machine angle θVSM (as described elsewhere) and for controlling the power output of the converter, based on determining the active power Pgrid from grid voltage Ugrid and grid current Igrid. The reactive power Qgrid may similarly be determined from Ugrid and Igrid. Alternatively, the grid voltage Ugrid may be measured on the high voltage HV side of the transformer and corrected based on the turns ratio of the transformer, or the internal voltage magnitude reference Vqref is used instead of the measured voltage Ugrid. Thus, in an alternative, internal voltage magnitude reference such as Vqref, Vdqref or Vαβref may be used for determining Pgrid and consequently the synchronous machine angle θVSM. The grid current Igrid supplied to the grid can also be measured.

Figure 3A:
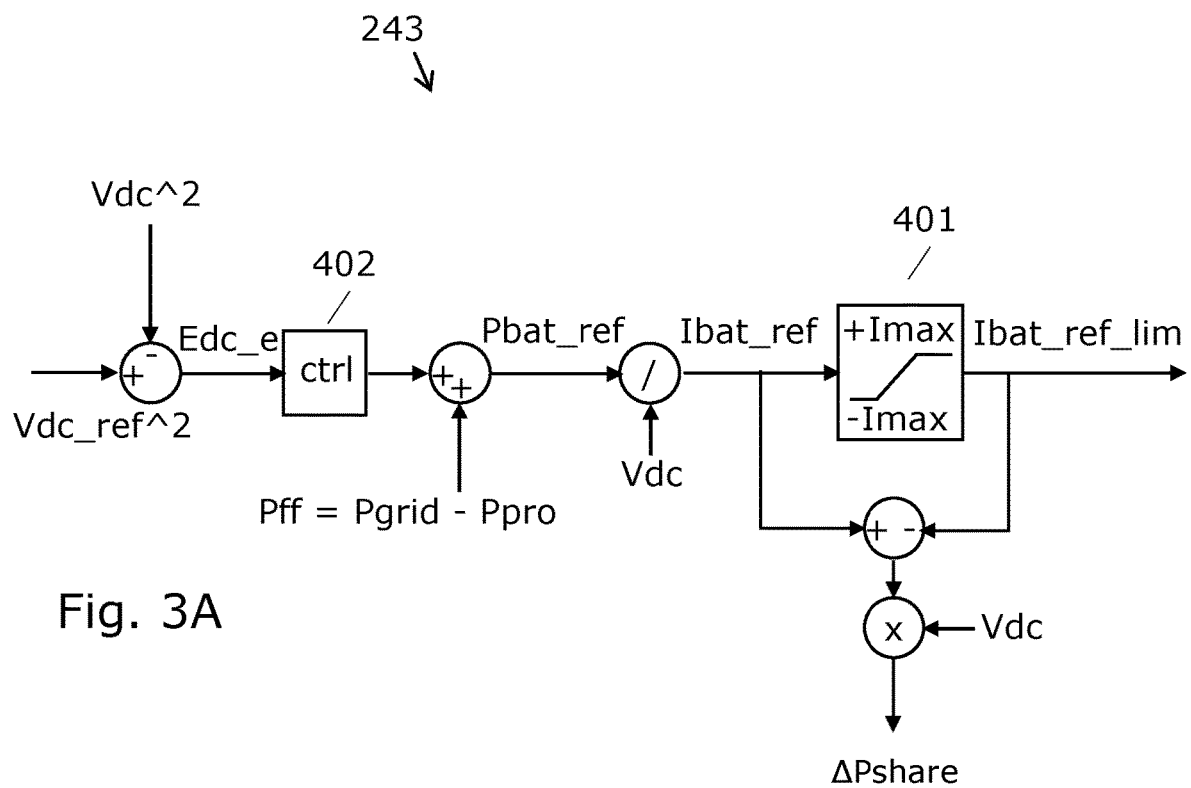
FIG. 3A shows a possible configuration of the DC-link controller.

FIG. 3A shows a possible configuration of the DC-link controller 243. The DC-link energy error $Edc\_e = Vdc\_ref^2 - Vdc^2$ is supplied to a controller 402, such as a P, PI or PID controller.

Optionally, a feedforward power term Pff is added to the output of the controller 402. The feedforward power term Pff may be determined as the power difference grid power Pgrid, i.e. the actual output power from the line side converter 204, and the power production reference Ppro. Accordingly, if there is a disturbance or variation of Ppro or Pgrid, the feedforward term Pff provides a faster correction of the resulting DC-link error Edc_e, Vdc_e.

The output Pbat_ref from the controller 402, with or without the power compensation Pff, is converted into a current reference Ibat_ref—i.e. a reference to the DC-to-DC converter 242 for the current to be directed to or from the battery 241 by division with the DC-link voltage Vdc.

The limit function 401 is provided to limit the charging current reference Ibat_ref to a limited charging current reference Ibat_ref_lim if the charging current reference Ibat_ref exceeds a positive charging current limit Imax, or a negative discharging current limit −Imax. The current limits Imax, −Imax reflects the maximal current capacity of the DC-to-DC converter 242 and/or the battery 241.

The limitation to Imax, −Imax ensures that the DC-to-DC converter 242 is not provided with a current reference above the maximal current capacity.

If one of the current limits Imax, −Imax is exceeded, since the controller 402 of the DC-link controller 243 needs a higher current for minimizing the DC-link error Edc_e, Vdc_e, a power sharing reference ΔPshare is determined based on additionally required charging or discharging current of the DC-link capacitor. For example, the power sharing reference ΔPshare may be determined as the difference between the charging current reference Ibat_ref and the limited charging current reference Ibat_ref_lim.

The power sharing reference ΔPshare is included in the determination of the power reference Pref supplied to the power controller 231, e.g. according to Pref=Pro+ΔPshare, so that the machine side converter 203 adjusts the power generation according to the battery current reference Ibat_ref to support controlling the DC-link voltage Vdc. In this way the power sharing power reference ΔPshare compensates the current capacity of the battery 241 in case the battery current is insufficient to control the DC-link voltage Vdc.

In order to use the machine side converter 203 to compensate current limitations of the DC-to-DC converter 242, when the current from the DC-to-DC converter 242 is not sufficient for meeting the required battery current reference Ibat_ref, other solutions may be devised wherein the power reference Pref is determined dependent on the power production reference Ppro, the charging current reference Ibat_ref and the current limits Imax, −Imax of the DC-to-DC converter 242 and/or the battery 241.

Figure 3B:
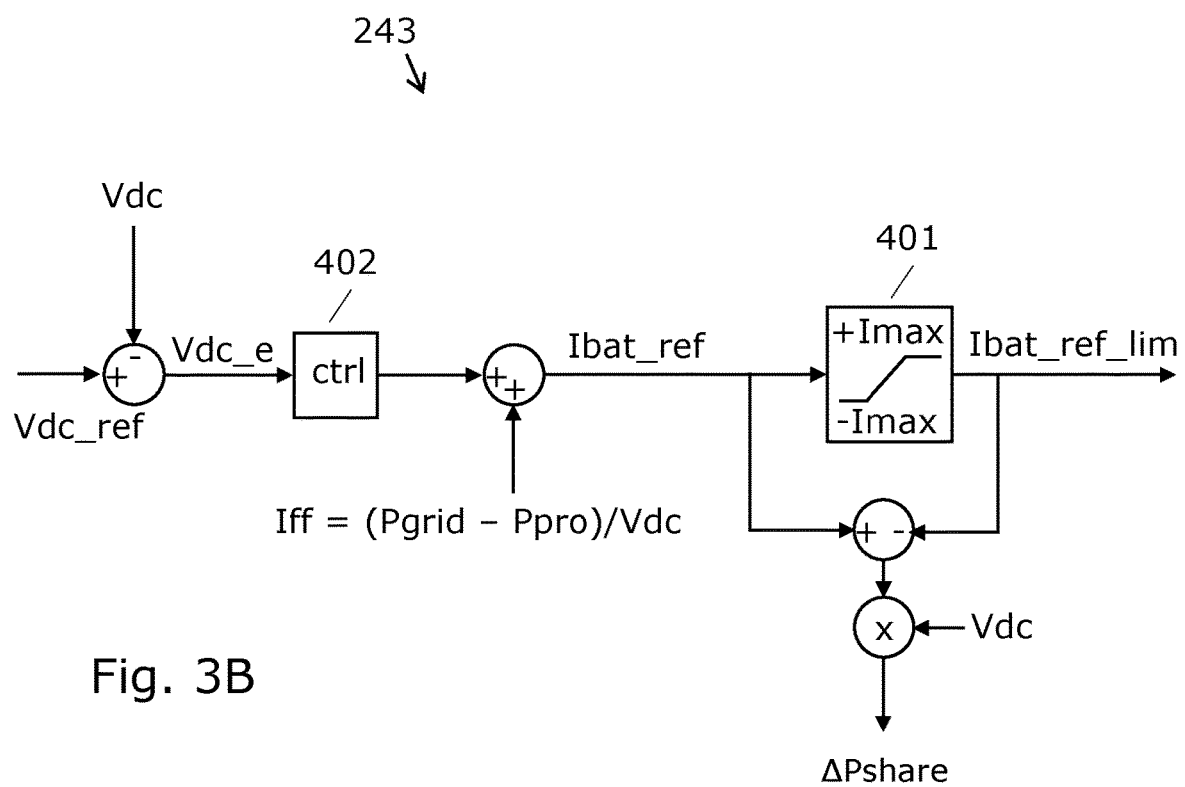
FIG. 3B shows another possible configuration of the DC-link controller.

FIG. 3B shows an alternative configuration of the DC-link controller 243 wherein the DC-link error is determined as a DC-link voltage error Vdc_e. In this configuration, which is equivalent with the solution of FIG. 4B, the output of the controller 402 is in units of current. Therefore, the optional feedforward term Iff is determined as Pff/Vdc, where Pff was determined in connection with FIG. 3A.

FIGS. 3A and 3B have been described with reference to charging current references Ibat_ref, Ibat_ref_lim and charging current limits Imax, −Imax. Instead of such current references and current limits, equivalent charging power references Pbat_ref, Pbat_ref_lim and charging power limits Pmax, −Pmax, or other electrical equivalents may be used. In general, charging references such as charging current references Ibat_ref, Ibat_ref_lim and charging limits such as charging current limits Imax, −Imax may be used in the DC-link controller 243.

Figure 4A:
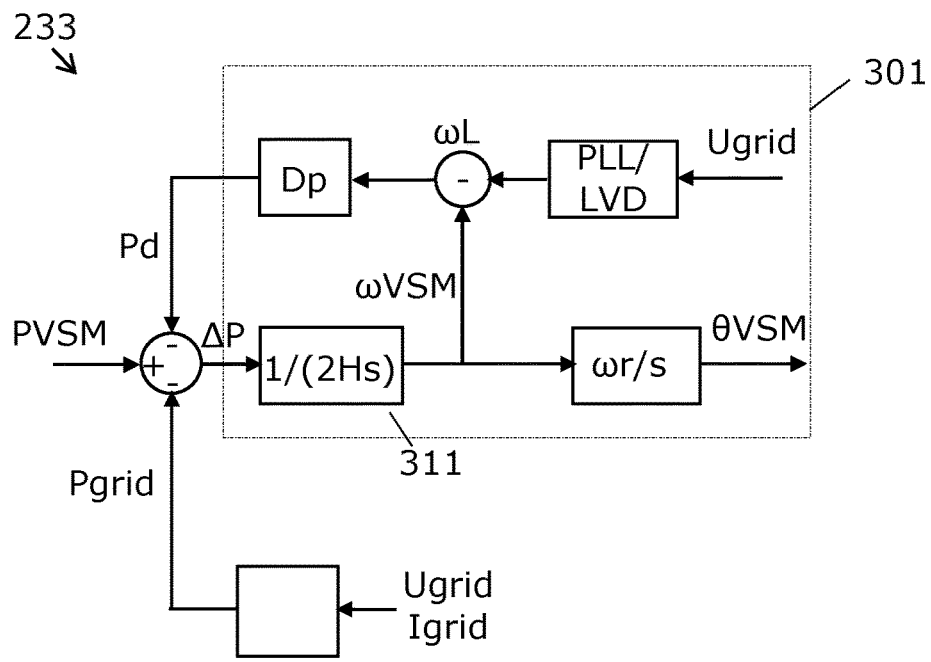
FIG. 4A shows an example of a configuration of the virtual synchronous machine emulator.

FIG. 4A shows an example of a configuration of the virtual synchronous machine emulator 233. The virtual synchronous machine emulator 233 is configured to determine a power deviation ΔP based on a combination of the second power control signal PVSM, the grid power Pgrid and a damping power Pd, e.g. as ΔP=PVSM−Pd−Pgrid, and to determine virtual synchronous machine speed and angle ωVSM, θVSM based on the power deviation ΔP so that the derivative of the virtual synchronous machine rotational speed ωVSM is indicative of the power deviation ΔP.

The synchronous machine angle θVSM is determined based on a virtual synchronous machine control concept which aims at generating a power response which corresponds to the power response from a real synchronous generator, including the inertia of the synchronous generator. This implementation of the virtual synchronous machine emulator 233 involves implementation of a swing equation to emulate of the virtual synchronous generator.

In this example, the power deviation ΔP is determined as the difference PVSM−Pd−Pgrid, where Pd is a damping power determined according to the virtual synchronous model 301, and Pgrid is the actual active power outputted by line side converter 204. Under steady state conditions, the value of the power error ΔP is zero.

In response to a change in the power reference PVSM due to a change in the power production reference Ppro or the state of charge power control signal PSoC, the power deviation ΔP becomes non-zero. This causes the virtual synchronous angle θVSM to increase or decrease to reduce the power error ΔP. For example, a battery voltage Vbat below the battery voltage reference Vbat_ref could generate an increase in PSoC which causes a positive power deviation ΔP and, thereby, an increase in the synchronous machine speed ωVSM.

Thus, in response to fluctuations in PVSM, the synthetic inertial response value becomes non-zero, which causes the virtual machine to either accelerate or decelerate to reach a new equilibrium condition.

The virtual synchronous machine control concept is utilized on the line side converter 204 using the swing equation to calculate θVSM.

The virtual synchronous model 301 includes a closed loop where the virtual synchronous machine rotational speed ωVSM is determined based the power deviation ΔP and an inertial integration model 311. The inertial integration model 311 is implemented as 1/(2Hs) where H is the inertia time constant and 1/s is the integration in s-domain. Accordingly, the power deviation ΔP is used as an input for the inertial integration model 311.

Since the derivative of the synchronous machine rotational speed ωVSM is proportional to the deviation between the second power control signal PVSM and the grid power Pgrid, the integration of the difference ΔP gives the synchronous machine rotational speed ωVSM.

The grid power Pgrid can be determined based on the measured grid voltage Ugrid—or internal voltage references such as the magnitude reference Vqref, or transformations thereof, and the measured grid current Igrid as indicated in FIG. 2.

The damping power Pd is determined as the difference between the rotational speed of the grid ωL and the synchronous machine rotational speed ωVSM multiplied with the damping factor Dp. The rotational speed of the grid ωL, i.e. the grid frequency is determined from the measured grid voltage Ugrid.

The synchronous machine angle θVSM is determined based on an integration of the synchronous machine rotational speed ωVSM according to ωr/s, where ωr is the rated synchronous generator speed.

Alternatively, the rotational speed of the grid ωL may be determined based on a high-pass filtering of the determined synchronous machine rotational speed ωVSM, i.e. by determining the rotational speed of the grid ωL as the output of a high-pass filter which is arranged to filter the inputted synchronous machine rotational speed ωVSM. In this alternative the damping power Pd is determined based on a high-pass filtering of the synchronous machine rotational speed ωVSM.

In general, the virtual synchronous model 301 determines the angle of the virtual machine θVSM based on the power deviation ΔP, the inertial integration model 311, e.g. implemented as 1/(2Hs) and a feedback of the damping power Pd determined based on ωVSM and an integration of ωVSM. In other words, the synchronous machine rotational speed ωVSM and the synchronous machine angle θVSM are determined so that they are indicative of an integrated deviation between the grid power Pgrid and the desired power output of the wind turbine PVSM, taking the damping power Pd into account.

The control system 200 and the damping control system 300 can be implemented based on power values Pref, Pdtd, Pd, Pgrid, but may equivalently be implemented based on corresponding torque values Tref, Tdtd, Td, Tgrid based on the relationship where power equals torque times rotation frequency, e.g. the synchronous machine rotational speed ωVSM.

Figure 4B:
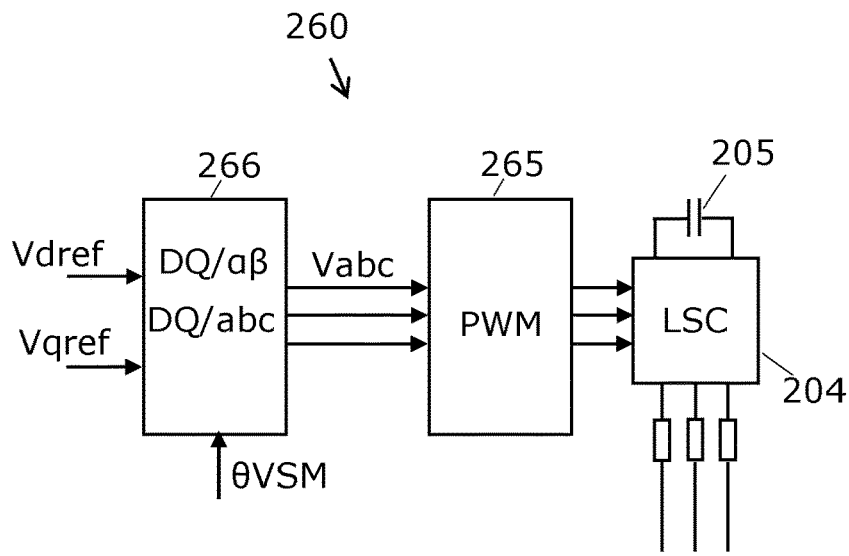
FIG. 4B shows an example of the modulation control system arranged for controlling the line side converter.

FIG. 4B shows an example of the modulation control system 260 arranged for controlling the generation of active power Pgrid and reactive power Qgrid supplied to the grid at the power output 270 from the wind turbine 100. That is, the modulation control system 260 is arranged for controlling the output active power Pgrid and the output voltage magnitude at the low voltage side LV, alternatively for controlling the output active power Pgrid and the output reactive power Qgrid at the low voltage side LV. In an example, the modulation control system 260 comprises a frame conversion unit 266 for determining the converter reference Vabc in a suitable non-rotating coordinate system and a pulse-width-modulator PWM, 265.

The active power, Pgrid, is controlled via the virtual synchronous machine angle θVSM. In short, the synchronous machine angle acceleration (the double-time derivative of θVSM) indicates a difference between a power reference Pref for a desired power output of the wind turbine and a grid power Pgrid supplied by the wind turbine to a power grid. Examples for determining the synchronous machine angle θVSM is given elsewhere.

The synchronous machine angle θVSM may be used to transform the signals from the rotating DQ frame into a non-rotating frame such as the αβ or abc frame, or vice-versa, Based on the synchronous machine angle θVSM and voltage magnitude reference Vqref, control signals for the desired active power and reactive power are determined.

Thus, the synchronous machine angle θVSM may be defined in a rotating DQ frame defined by the angular position θVSM. Based on the synchronous machine angle θVSM, control signals, i.e. the angle of the modulation voltage signals for the pulse-width-modulator PWM, 265 are determined and transformed into a non-rotating frame such as the αβ or abc frame. The resulting converter reference signal Vabc controls the active and reactive power Pgrid and Qgrid.

The frame conversion unit 266 transforms the control signal from the DQ frame into the αβ or abc frame and determines the sinusoidal converter reference signal Vabc for the PWM 265. The frame converted output signals from the frame conversion unit 266 are converted by the pulse-width-modulator PWM, 265 into a modulation signal for the grid side converter 204 in order to generate the desired active power Pgrid and reactive power Qgrid and/or voltage magnitude Ugrid.

The reactive power Qgrid to be generated by the line side converter 204 can be controlled based on a voltage magnitude reference Vqref.

In general, the voltage reference Vqref may be a reference for a voltage amplitude Ugrid or a reactive power Qgrid to be generated by the line side converter 204. In this way, based on the voltage reference Vqref and the synchronous machine angle θVSM, the converter reference Vabc is determined for controlling the line side converter 204 to generate the desired active power Pgrid and consequently the reactive power Qgrid.

The voltage magnitude reference Vqref may be defined in the DQ frame which rotates with the rotational speed ωVSM of the virtual synchronous machine, i.e. in steady state condition the fundamental frequency such as 50 Hz of the AC grid voltage. The voltage magnitude reference Vqref may be converted from the DQ frame to the αβ or abc frame and outputted from the frame conversion unit 266 as a converter reference Vabc to the pulse-width-modulator PWM, 265 which determines the modulation signal for the grid side converter 204.

Figure 5:
FIG. 5 shows how the generator power is stable while the battery supplies power for reducing an unintended variation in the grid power.

FIG. 5 shows grid power Pgrid in graph 501, generator power Pgen in curve 502, battery current Ibat in curve 503 and battery power in curve 504.

The simulation in FIG. 5 is based on a phase jump which cause disturbances in the grid power (curve 501). The grid power is disturbed but the generator power Pgen in curve 502 is kept more or less constant by help of the battery 241. That is, the battery supplies battery current Ibat to the DC-link capacitor so that a change in the generator power Pgen is not required for compensating the DC-link voltage error Vdc_e. The constant generator power leads to reduced mechanical loads.

The invention claimed is:

1. A control system configured for controlling power generation of a wind turbine, the wind turbine comprises a generator driven by a rotor, a machine side converter, a line side converter arranged to supply power to a grid, a DC link electrically connected to an output of the machine side converter and an input of the line side converter, and an electric storage device electrically connected to the DC link, the control system comprises:
   a power controller arranged to determine a first power control signal to the machine side converter based on a power reference and a generator power (Pgen) for controlling an output power of the machine side converter;
   a charging controller arranged to determine a second power control signal (PVSM) for controlling, at least indirectly, a desired output power (Pgrid) of the line side converter based on a storage device voltage error, and a power production reference; and
   a DC-link controller arranged to determine a charging current reference for controlling charging and discharging of the electric storage device based on a DC-link error,
   wherein the wind turbine is configured as a grid forming wind turbine such that a power flow from the wind turbine to the grid is coupled to events in the grid that are transferrable to the wind turbine as mechanical loads, and
   wherein the second power control signal is applied to a virtual synchronous machine emulator which is arranged to determine at least one of a virtual synchronous machine speed or angle for controlling the line side converter.

2. The control system according to claim 1, wherein the control system is configured to determine the power reference (Pref) dependent on the power production reference and dependent on the charging current reference and a charging limit.

3. The control system according to claim 1, wherein the DC-link controller is further configured to determine the charging current reference dependent on a limit function arranged to limit the charging current reference to a limited charging reference if the charging current reference exceeds a charging limit.

4. The control system according to claim 3, wherein the DC-link controller is further arranged to determine a power sharing reference based on a difference between the charging current reference and the limited charging reference and the power reference is determined dependent on a sum of the power production reference and the power sharing reference.

5. The control system according to claim 1, wherein the DC-link controller is further configured to determine the charging current reference dependent on a feedforward power difference determined based on a grid power and the power production reference.

6. The control system according to claim 1, wherein the DC-link controller is further configured to determine the charging current reference based on a control function arranged to time-integrate the DC-link error.

7. The control system according to claim 1, wherein the electric storage device is electrically connected to the DC link via a DC-to-DC converter, and wherein the DC-to-DC converter is configured to control the charging and discharging of the electric storage device based on the charging current reference or a limited charging reference.

8. The control system according to claim 1, wherein the wind turbine is configured as a virtual synchronous machine.

9. The control system according to claim 1, wherein the virtual synchronous machine emulator is configured to:
   determine a power deviation based on a combination of the second power control signal, a grid power supplied by the line side converter to the grid, and a damping power; and
   determine virtual synchronous machine speed or angle based on the power deviation so that a derivative of the virtual synchronous machine speed is indicative of the power deviation.

10. The control system according to claim 9, wherein the control system is further arranged to:
   determine a converter reference for controlling the line side converter to generate the desired output power based on the virtual synchronous machine angle and a voltage reference for a voltage amplitude or a reactive power (Qgrid) to be generated by the line side converter; and
   control the line side converter based on the converter reference.

11. The control system according to claim 1, wherein the electric storage device comprises at least one battery, super capacitor, fly wheel or superconducting magnetic energy storage device, or any combination thereof.

12. A method for controlling power generation of a wind turbine, the wind turbine comprising a generator driven by a rotor, a machine side converter, a line side converter arranged to supply power to a grid, a DC link electrically connected to an output of the machine side converter and an input of the line side converter, and an electric storage device electrically connected to the DC link; the method comprising:
   determining a first power control signal to the machine side converter based on a power reference and a generator power for controlling an output power of the machine side converter;
   determining a second power control signal for controlling, at least indirectly, a desired output power of the line side converter based on a storage device voltage error, and a power production reference; and
   determining a charging current reference for controlling charging and discharging of the electric storage device based on a DC-link error, wherein the charging current reference is determined dependent on a limit function arranged to limit the charging current reference to a limited charging reference when the charging current reference exceeds a charging limit, and
   wherein a power sharing reference is determined based on a difference between the charging current reference and the limited charging reference and wherein the power reference is determined dependent on a sum of the power production reference and the power sharing reference.

13. The method according to claim 12, wherein the power reference is determined dependent on the power production reference and dependent on the charging current reference and a charging limit.

14. A computer program product comprising software code adapted to perform an operation controlling a wind turbine when executed on a data processing system, the wind turbine comprising a generator driven by a rotor, a machine side converter, a line side converter arranged to supply power to a grid, a DC link electrically connected to an output of the machine side converter and an input of the line side converter, and an electric storage device electrically connected to the DC link; the operation, comprising:

determining a first power control signal to the machine side converter based on a power reference and a generator power for controlling an output power of the machine side converter;

determining a second power control signal for controlling, at least indirectly, a desired output power of the line side converter based on a storage device voltage error, and a power production reference; and determining a charging current reference for controlling charging and discharging of the electric storage device based on a DC-link error;

determining, by a virtual synchronous machine emulator, a power deviation based on a combination of the second power control signal, a grid power supplied by the line side converter to the grid, and a damping power; and determining, by the virtual synchronous machine emulator, a virtual synchronous machine speed or angle for controlling the line side converter based on the power deviation so that a derivative of the virtual synchronous machine speed is indicative of the power deviation.

15. The computer program product according to claim 14, wherein the power reference is determined dependent on the power production reference and dependent on the charging current reference and a charging limit.

16. A wind turbine, comprising:
    a rotor;
    a generator driven by the rotor;
    a machine side converter;
    a line side converter arranged to supply power to a grid;
    a DC link electrically connected to an output of the machine side converter and an input of the line side converter;
    an electric storage device electrically connected to the DC link; and
    a control system configured for controlling power generation of the wind turbine that is configured as a virtual synchronous machine, the control system comprises:
        a power controller arranged to determine a first power control signal to the machine side converter based on a power reference and a generator power for controlling an output power of the machine side converter;
        a charging controller arranged to determine a second power control signal for controlling, at least indirectly, a desired output power of the line side converter based on a storage device voltage error and a power production reference; and
        a DC-link controller arranged to determine a charging current reference for controlling charging and discharging of the electric storage device based on a DC-link error, wherein the DC-link controller is further configured to determine the charging current reference dependent on a limit function arranged to limit the charging current reference to a limited charging reference if the charging current reference exceeds a charging limit, and wherein the DC-link controller is further arranged to determine a power sharing reference based on a difference between the charging current reference and the limited charging reference and the power reference is determined dependent on a sum of the power production reference and the power sharing reference.

17. The wind turbine according to claim 16, wherein the DC-link controller controls a DC-link converter to control electric power from the electric storage device to the DC-link when a DC-link voltage drops at the DC-link.

18. The wind turbine according to claim 17, wherein the control system is further configured to determine whether the DC-link voltage has reached a threshold, and when the DC-link voltage has reached the threshold, the control system is configured to control the machine side converter to adjust the DC-link voltage to a desired DC-link voltage.

19. The wind turbine according to claim 16, wherein a virtual synchronous machine emulator of the control system is configured to:
    determine a power deviation based on a combination of the second power control signal, a grid power supplied by the line side converter to the grid, and a damping power; and
    determine a virtual synchronous machine speed or angle based on the power deviation so that a derivative of the virtual synchronous machine speed is indicative of the power deviation.

\* \* \* \* \*